(12) United States Patent
Girgensohn et al.

(10) Patent No.: US 9,940,974 B2
(45) Date of Patent: *Apr. 10, 2018

(54) SYSTEMS AND METHODS FOR VISUALIZING PLAYBACK PLANS OF HYPERMEETINGS

(71) Applicant: FUJI XEROX CO., LTD., Tokyo (JP)

(72) Inventors: Andreas Girgensohn, Palo Alto, CA (US); Frank M. Shipman, III, College Station, TX (US); Lynn Donelle Wilcox, Redwood City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/862,141

(22) Filed: Sep. 22, 2015

(65) Prior Publication Data

US 2016/0180890 A1    Jun. 23, 2016

Related U.S. Application Data

(63) Continuation-in-part of application No. 14/692,731, filed on Apr. 21, 2015, which is a continuation-in-part of application No. 14/574,386, filed on Dec. 17, 2014.

(51) Int. Cl.
*H04N 5/91* (2006.01)
*G11B 27/28* (2006.01)
(Continued)

(52) U.S. Cl.
CPC ............ *G11B 27/28* (2013.01); *G06F 3/0481* (2013.01); *G06Q 10/1095* (2013.01);
(Continued)

(58) Field of Classification Search
None
See application file for complete search history.

(56) References Cited

U.S. PATENT DOCUMENTS 8,635,293 B2    1/2014  Fisher et al.
2009/0162025 A1*  6/2009  Girgensohn .......... G11B 27/034
                                           386/241
(Continued)

OTHER PUBLICATIONS

Andreas Girgensohn, Jennifer Marlow, Frank Shipman, Lynn Wilcox. 2015 HyperMeeting: Supporting Asynchronous Meetings with HyperVideo. To appear in ACM Multimedia 2015.
(Continued)

*Primary Examiner* — Eileen Adams
(74) *Attorney, Agent, or Firm* — TransPacific Law Group; Pavel I. Pogodin, Esq.

(57) ABSTRACT

A computer-implemented method for visualizing a playback plan of a hypervideo, the hypervideo comprising a plurality of video segments from a plurality of videos linked together using a plurality of links, the method being performed in connection with a computerized system comprising a central processing unit, a display device and a memory, the computer-implemented method involving: generating the playback plan for an automated playback of the hypervideo, the automated playback comprising automatically following the plurality of links linking the plurality of video segments such that at least some of the plurality of video segments are played in a predetermined sequence, wherein the plurality of links are followed based on the playback plan; and generating a graphical user interface portion on the display device for visualizing the playback plan.

23 Claims, 16 Drawing Sheets

(51) Int. Cl.
    *G06F 3/0481* (2013.01)
    *G06Q 10/10* (2012.01)
    *G11B 27/10* (2006.01)
    *G11B 27/34* (2006.01)
    *H04N 5/765* (2006.01)
    *H04N 9/82* (2006.01)

(52) U.S. Cl.
    CPC ............ *G11B 27/105* (2013.01); *G11B 27/34* (2013.01); *H04N 5/765* (2013.01); *H04N 5/91* (2013.01); *H04N 9/8205* (2013.01)

(56) References Cited

U.S. PATENT DOCUMENTS

2010/0281375 A1* 11/2010 Pendergast .......... G11B 27/034
    715/723

2010/0293190 A1* 11/2010 Kaiser .................... G06F 3/048
    707/769
2013/0145269 A1* 6/2013 Latulipe ................. G06F 3/048
    715/720
2013/0325972 A1* 12/2013 Boston ............... G06K 9/00751
    709/206
2014/0047335 A1* 2/2014 Lewis .................. G06F 3/0484
    715/716

OTHER PUBLICATIONS

J. Barksdale et al. Video threads: asynchronous video sharing for temporally distributed teams. In Proc. of CSCW '12. ACM, New York, NY, 1101-1104.

John Tang. Time travel proxy: using lightweight video recordings to create asynchronous, interactive meetings. In Proc. of CHI '12. ACM, New York, NY, USA, 3111-3120.

* cited by examiner

SYSTEMS AND METHODS FOR VISUALIZING PLAYBACK PLANS OF HYPERMEETINGS

CROSS-REFERENCE TO RELATED PATENT APPLICATIONS

This U.S. patent application replies upon, claims the benefit of priority from and is a continuation-in-part of a U.S. patent application Ser. No. 14/692,731, filed on Apr. 21, 2015, which claims the benefit of priority from and is a continuation-in-part of a U.S. patent application Ser. No. 14/574,386, filed on Dec. 17, 2014, both of which are incorporated by reference herein in their entirety.

BACKGROUND OF THE INVENTION

Technical Field

The disclosed embodiments relate in general to techniques for automating hypervideo playback and, more specifically, to systems and methods for visualizing playback plans of hypermeetings.

Description of the Related Art

Meetings are an important part of collaborative activities but are difficult to schedule, particularly when a set of collaborators is spread across multiple locations and time zones. Additionally, meetings often overlap in terms of content. This can cause difficulties as meetings that build on what was discussed in prior meetings result in barriers for those not at prior meetings and meetings that re-discuss topics are often viewed as unproductive by the participants that were at prior meetings.

Meetings with asynchronous participation are desired but currently not well supported. Systems either treat the original meeting as a series of independent discussions, losing their interconnections, or they record everything putting the onus of locating and responding to discussion on participants. U.S. patent application Ser. No. 14/574,386 describes a solution for recording multiple asynchronous meetings by representing a series of meetings in a form of navigable video recordings called a hypervideo. The hypervideo consists of several video segments that are linked together using links.

As would be appreciated by persons of ordinary skill in the art, such hypervideos may be displayed in many different ways. While manual link following is possible, automatic link following and other assisted navigation to support the viewer in seeing relevant parts of the hypervideo in the appropriate order during hypervideo playback would be desirable. Additionally desirable would be a system that would provide visualizations of playback sequences of video segments in hypervideo.

SUMMARY OF THE INVENTION

The embodiments described herein are directed to methods and systems that substantially obviate one or more of the above and other problems associated with conventional technology for video playback.

In accordance with one aspect of the inventive concepts described herein, there is provided a computer-implemented method for visualizing a playback plan of a hypervideo, the hypervideo comprising a plurality of video segments from a plurality of videos linked together using a plurality of links, the method being performed in connection with a computerized system comprising a central processing unit, a display device and a memory, the computer-implemented method involving: generating the playback plan for an automated playback of the hypervideo, the automated playback comprising automatically following the plurality of links linking the plurality of video segments such that at least some of the plurality of video segments are played in a predetermined sequence, wherein the plurality of links are followed based on the playback plan; and generating a graphical user interface portion on the display device for visualizing the playback plan.

In one or more embodiments, the graphical user interface portion comprises a timeline for one of the plurality of videos.

In one or more embodiments, the graphical user interface portion comprises a video selection portion for selecting one of the plurality of videos.

In one or more embodiments, upon selection of the one of the plurality of videos, the graphical user interface portion displays a timeline for the selected one of the plurality of videos.

In one or more embodiments, each of the plurality of videos in the video selection portion is color-coded.

In one or more embodiments, the graphical user interface portion comprises a merged timeline for at least two of the plurality of videos.

In one or more embodiments, the merged timeline comprises a plurality of color-coded timeline portions corresponding to each of the least two of the plurality of videos.

In one or more embodiments, the graphical user interface portion comprises a merge timeline widget and wherein upon activation of the merge timeline widget by a user, the graphical user interface portion displays the merged timeline for at least two of the plurality of videos.

In one or more embodiments, the graphical user interface portion comprises a playback control portion comprising a play button.

In one or more embodiments, the graphical user interface portion comprises timelines for each of the plurality of videos.

In one or more embodiments, each of the timelines is color-coded.

In one or more embodiments, each of the plurality of video segments included in the playback plan is marked on the timeline for the corresponding one of the plurality of videos.

In one or more embodiments, each of the plurality of video segments included in the playback plan is marked on the timeline for the corresponding one of the plurality of videos with a different color or a different shade.

In one or more embodiments, the graphical user interface portion comprises a playback control portion and wherein the playback control portion indicates an active timeline corresponding to a video from the plurality of videos being currently played.

In one or more embodiments, the graphical user interface portion comprises a playback indicator for visualizing a traversal of one of the plurality of links included in the playback plan.

In one or more embodiments, the playback indicator is animated and moves between two timelines corresponding to the videos linked by the one of the plurality of links.

In one or more embodiments, the graphical user interface portion comprises a back widget and wherein upon activation of the back widget by a user, the graphical user interface portion reverts to a previous playback state.

In one or more embodiments, the graphical user interface portion comprises a tooltip portion comprising information on the previous playback state.

In one or more embodiments, the information on the previous playback state comprises date, time and topic of a corresponding meeting.

In one or more embodiments, the method further comprises maintaining a history of hypervideo navigation states.

In accordance with another aspect of the inventive concepts described herein, there is provided a computerized system for visualizing a playback plan of a hypervideo, the hypervideo comprising a plurality of video segments from a plurality of videos linked together using a plurality of links, the computerized system comprising a central processing unit, a display device and a memory storing a set of computer-executable instructions for: generating the playback plan for an automated playback of the hypervideo, the automated playback comprising automatically following the plurality of links linking the plurality of video segments such that at least some of the plurality of video segments are played in a predetermined sequence, wherein the plurality of links are followed based on the playback plan; and generating a graphical user interface portion on the display device for visualizing the playback plan.

In accordance with yet another aspect of the inventive concepts described herein, there is provided a non-transitory computer-readable medium embodying a set of computer-executable instructions, which, when executed in a computerized system comprising a central processing unit, a display device and a memory, cause the computerized system to perform a method for visualizing a playback plan of a hypervideo, the hypervideo comprising a plurality of video segments from a plurality of videos linked together using a plurality of links, the method comprising: generating the playback plan for an automated playback of the hypervideo, the automated playback comprising automatically following the plurality of links linking the plurality of video segments such that at least some of the plurality of video segments are played in a predetermined sequence, wherein the plurality of links are followed based on the playback plan; and generating a graphical user interface portion on the display device for visualizing the playback plan.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The aforementioned co-pending U.S. patent application Ser. No. 14/692,731 describes an approach to automatic playback of hypervideo using playback plans. In accordance with the approach presented therein, playback plans describe different paths through a hypervideo that are automatically followed during playback. One source of hypervideo are hypermeetings, which support asynchronous meetings by creating navigable video recordings of them.

In accordance with one aspect of the embodiments described herein, there are provided techniques for improving, or making more practical, the use of the aforesaid playback plans. The described embodiments include visualizations techniques for playback plans. These techniques are of importance because they are helpful for users to develop expectations for what they will see and to understand the relationships between the various video segments that make up a phypervideo layback plan.

In accordance with another aspect of the embodiments described herein, there are provided systems and methods for implementing transitions between views of playback plans. As would be appreciated by persons of ordinary skill in the art, no one visualization is likely to be appropriate for all contexts. In particular, some visualizations hide content not part of the plan while others show that content and enable navigation not possible in other views. Additionally, certain user actions (e.g. navigation out of a playback plan) imply a need to change the visualization.

Finally, in accordance with yet another aspect of the embodiments described herein, there are provided systems and methods for storing and using the history of playback plans. These systems and methods enable users to have the equivalent to a Web browser's "back" and "forward" buttons to navigate to prior states of the system.

Hypermeetings

Figure 1:
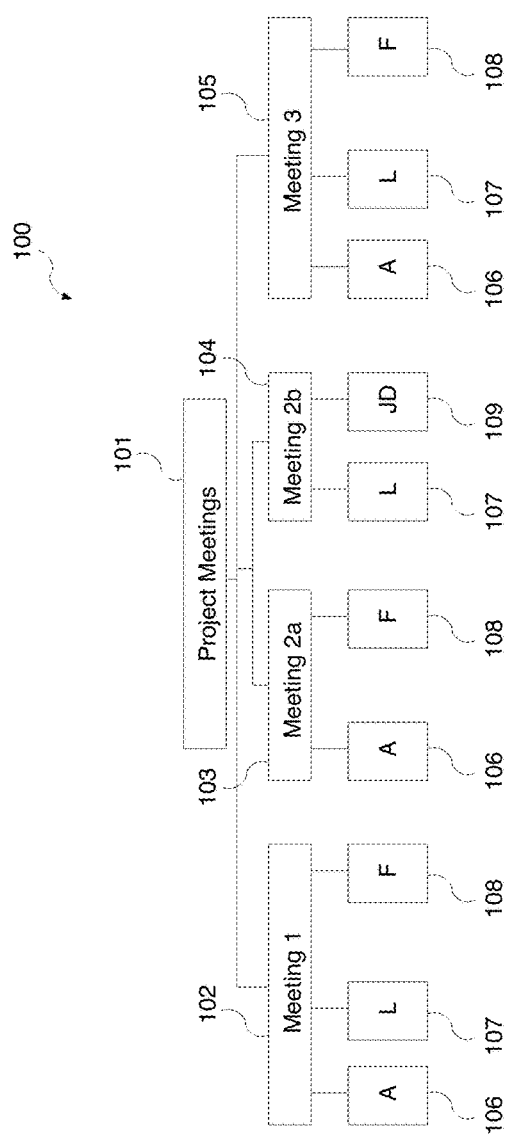
FIG. 1 illustrates an example of a meeting structure being addressed by one or more embodiments described herein.

With reference to an example 100 shown in FIG. 1, consider the case where periodic project meetings 101 occur for a project involving a distributed team, Andreas 106 and Lynn 107 in Palo Alto and Frank 108 in College Station. As such, remote meeting software is required but as the members of the team have other projects/responsibilities as well they are not always available for every scheduled meeting. Additional team members at both sites are involved in the meetings periodically and sometimes in-person meetings about the project occur at one site without coordinating with the other site.

As shown in FIG. 1, a kickoff meeting (Meeting 1, designated by numeral 102 in FIG. 1) occurs with Andreas 106, Lynn 107, and Frank 108 each recorded in their own video (although Lynn and Andreas could have an in-person meeting). The next week, Lynn 107 is not available at the normal meeting time but Andreas 106 and Frank 108 meet to discuss progress and look back at the recordings from the prior week's meetings to make sure they remember Lynn's perspective on some of the design issues (Meeting 2a, 103 in FIG. 1). As meetings participants replay and comment on the prior recordings, links are automatically generated between the original and later meeting and, sometimes, Andreas and Frank attach labels to the links to indicate what was the topic of the discussion. Later, Lynn meets with JD 109 to further discuss the project (Meeting 2b, 104 in FIG. 1). Their meeting is initially a set of reactions/responses to Meeting 2a in which they use the links generated during meeting 2a while also generating new hyperlinks, but move on to other topics as well. In week 3, the regularly scheduled distributed meeting (Meeting 3, 105 in FIG. 1) takes place using the recordings and links from Meetings 1, 2a, and 2b as questions arise and generating more links that enable tracing the discussion of topics across meetings in future project meetings.

Figure 2A:
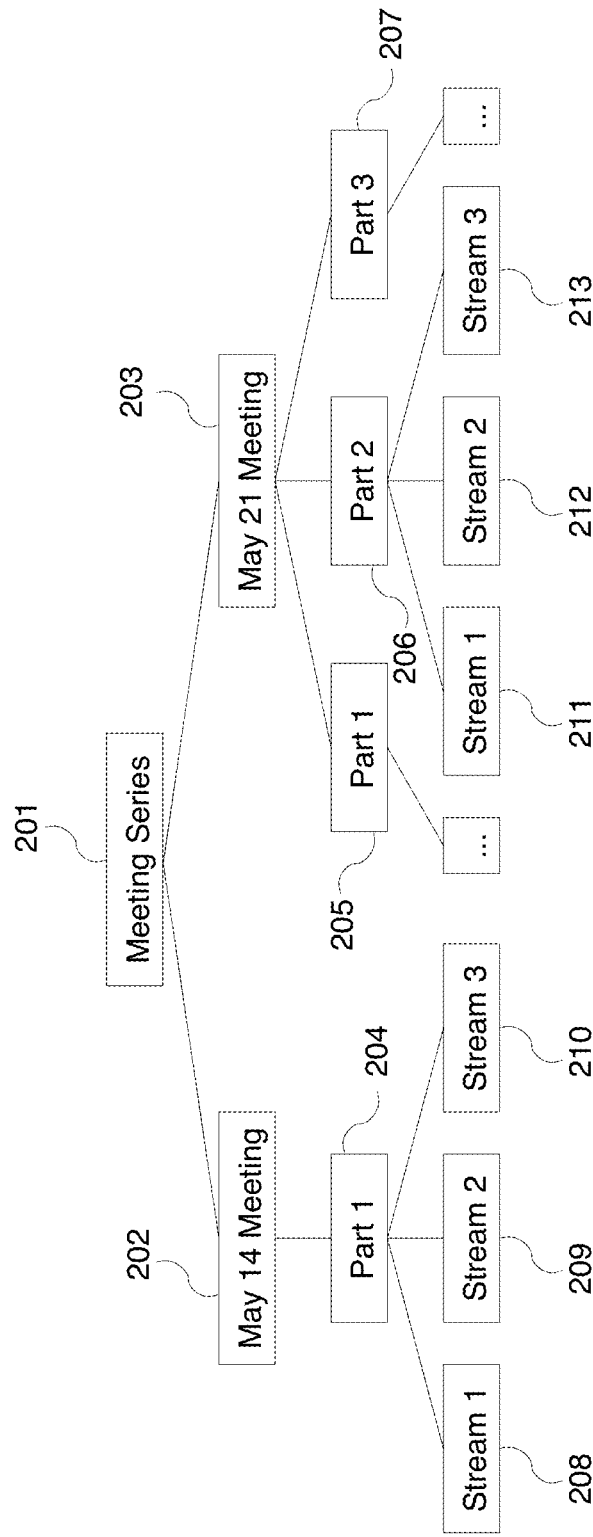
FIGS. 2(a) and 2(b) illustrates exemplary embodiments of data structures and tables for representing hypermeetings.
Figure 2B:
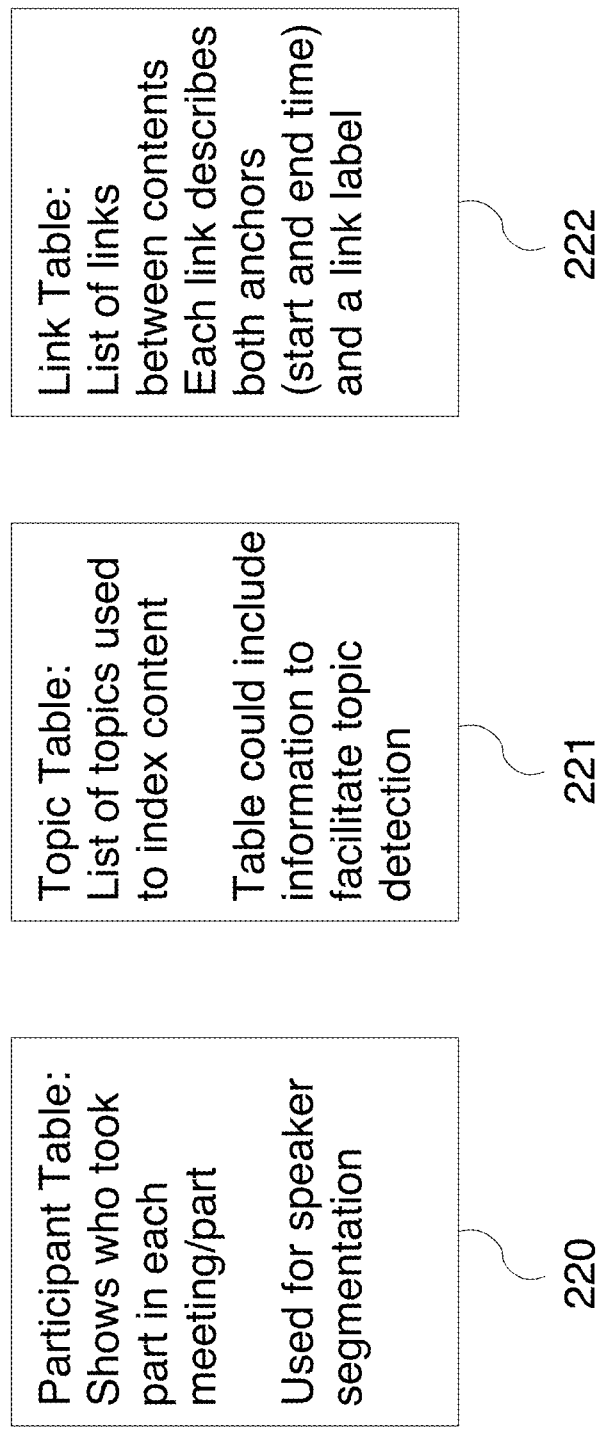

As it is clear from this example, an important aspect of supporting both meeting participants and those who miss meetings is to denote relations among meetings as new meeting content is recorded. To this end, one or more embodiments described herein represent recorded content and metadata describing this content in a number of data structures and tables as shown, for example, in FIGS. 2(a) and 2(b)(note this is not the data structure for the meeting described in FIG. 1). Specifically, FIGS. 2(a) and 2(b) illustrate exemplary embodiments of data structures and tables for representing hypermeetings. In various embodiments, the exemplary data structures shown in FIGS. 2(a) and 2(b) may be stored in a database, such as a relational database well known to persons of ordinary skill in the art, or in any other suitable form, such as in any other data structure, on a computer-readable medium. It should be also noted that the concepts described herein are not limited to any specific data structure used for storing meeting information. Therefore, examples of such structures given herein should not be construed in a limited sense.

With reference to FIG. 2(a), the Meeting Series 201 represents a recurring meeting or a series of interrelated meetings. Each Meeting 202 and 203 in the Meeting Series 201 is itself composed of one or more Meeting Parts 204, 205, 206 and 207, which are the synchronous activities that make up a logical meeting. Each meeting part 204-207 is further composed of one or more respective synchronized video streams 208, 209, 210, 211, 212 and 213 (video takes) and associated additional data. In various embodiments, a meeting part 204-207 may be composed of a single video stream—as would be the case when an individual is recording reactions and/or responses to a previously recorded meeting part that they could not attend.

In various embodiments, metadata associated with elements of the meeting series may include the list of participants who participate in each meeting part 204, 205, 206 and 207, the topics assigned to segments of the corresponding meeting parts, and the links within and between different meeting parts. In various embodiments, meeting parts may be segmented based on the identity of the speaker and/or the topics being discussed. Techniques for such segmentation are well known to persons of ordinary skill in the art. In various embodiments, this segmentation of the meeting parts based on the identity of the speaker and the topics being discussed is used to provide finer access into the meeting recordings. In various embodiments, automatic, semi-automatic, and manual techniques for segmentation, indexing, and linking may be used in connection with the aforesaid meeting parts.

With reference to FIG. 2(b), an embodiment of the described system may use a participant table 220, which stores information on the participants of each meeting. This information may be used, for example, for speaker segmentation as described in detail below. In addition, topic table 221 may be provided. This table may include a list of topics, which may be used to index contents of the meetings. Finally, in various embodiments, a link table 222 may be provided, which contains a list of links between contents of the meetings. In various embodiments, each link record contains information on link anchors (start and end time) as well as a link label. The tables 220-222 may be stored in a database, such as a relational database well known to persons of ordinary skill in the art.

Exemplary Meeting Recording Process

Figure 3:
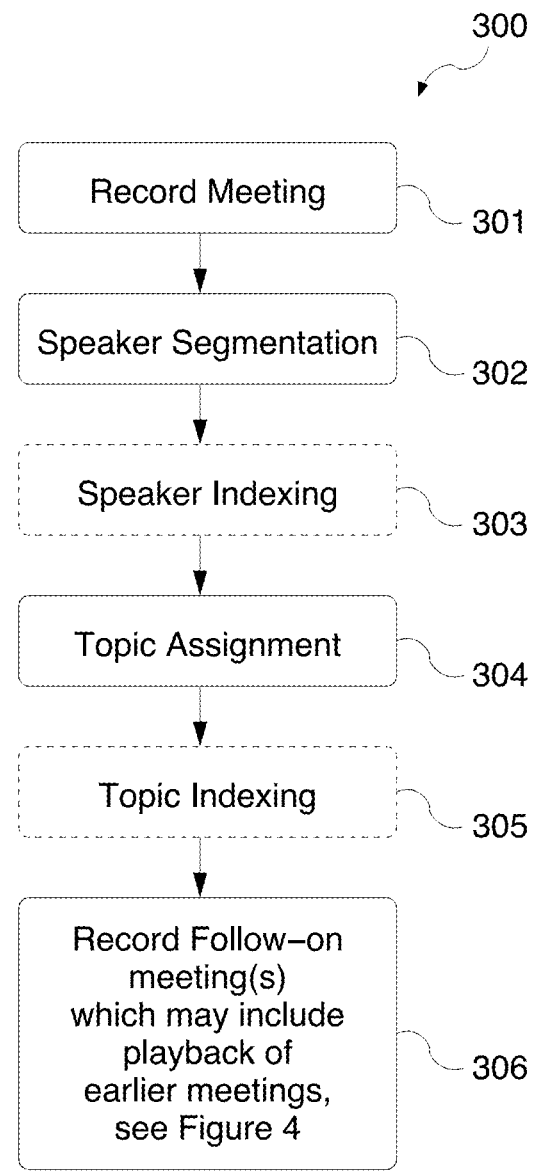
FIG. 3 illustrates an exemplary embodiment of an operating sequence of a process for recording, indexing, and linking of content associated with a meeting.

FIG. 3 illustrates an exemplary embodiment of an operating sequence 300 of a process for recording, indexing, and linking of content associated with a meeting. First, at step 301, a meeting is recorded that consists of one or more synchronized audiovisual streams. In various embodiments, the meeting may be recorded by capturing audio and video using cameras and microphones in a meeting room or by capturing audio and video using cameras and microphones on user's personal devices, such as tables or smartphones. This recorded content is then analyzed using known methods for performing speaker segmentation, see step 302. Thereafter, at step 303, the content may be indexed based on the identified speakers. Specifically, index of start and end times may be created to each speaker at the meeting.

Once the synchronized video content has been segmented based on speaker (and optionally indexed), any assigned topics are attached to segments indicated as overlapping, see step 304. Additionally, indexing of the content based on the assigned topics may be performed in step 305. The resulting segmented video streams and attached metadata (e.g. topics attached to segments) are then used during playback (illustrated in FIG. 4), which results in the creation of follow-on content linked to the previously recorded content, see step 306.

Exemplary Meeting Playback Process

Figure 4:
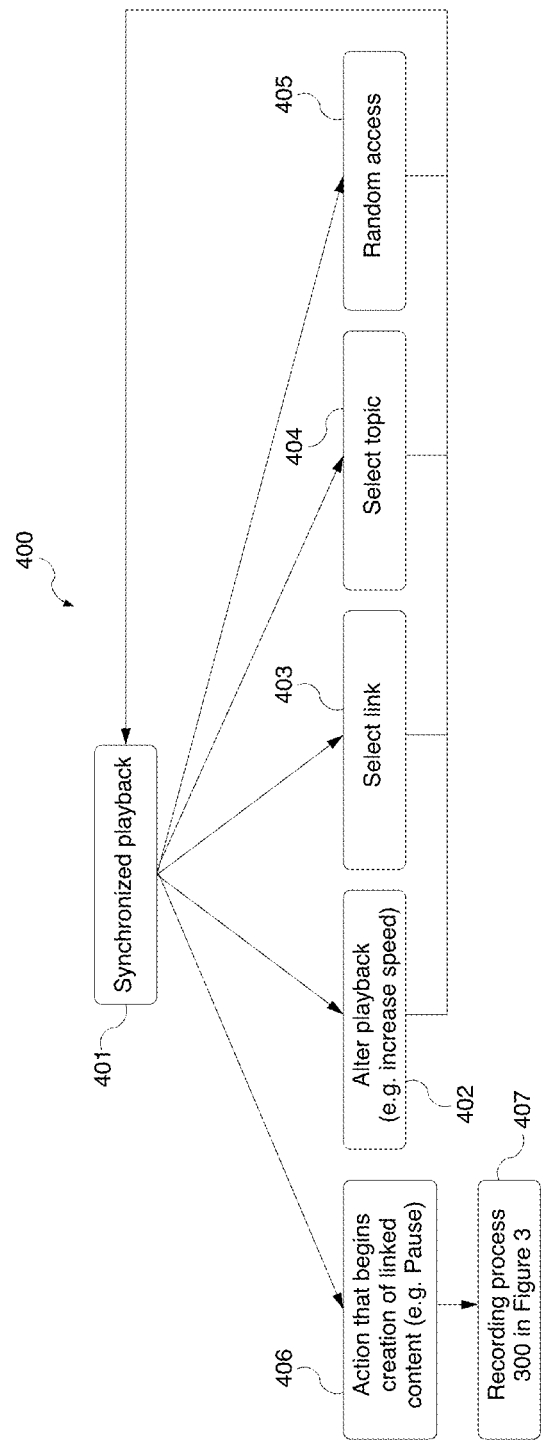
FIG. 4 illustrates an exemplary embodiment of an operating sequence of a process for playback of recorded meetings, which involves the synchronized playback of prior recorded content.

FIG. 4 illustrates an exemplary embodiment of an operating sequence 400 of a process for playback of recorded meetings, which involves the synchronized playback of prior recorded content (using the results generated by the process illustrated in FIG. 3). Because the multiple viewers of the recorded content are distributed geographically yet need to be viewing the same content at the same time (the playback is synchronized), an embodiment of the described system captures and broadcasts any events that alter playback among those watching the recordings. As shown in FIG. 4, during the synchronized playback 401, an embodiment of the described system captures the events 402-405, which include events 402 altering the playback speed (slowing down or speeding up), events 403 selecting a link, events 404 selecting a topic, as well as events 405 selecting a position in the timeline causing the playback for all viewers to synchronously switch to a new position in the same or different set of video recordings. In addition, during the synchronized playback 401, one of the viewers may initiate an action 406 that begins the recording of activity/discussions among the current participants via the process 300 illustrated in FIG. 3, see step 407 in FIG. 4.

In one or more embodiments, the described system performs automatic generation and presentation of persistent links between segments of interrelated meeting recordings based on normal meeting viewing and recording behavior of the users. These generated persistent links are stored for subsequent use. First, an exemplary user interface will be described and, subsequently, particular capabilities of the environment will be addressed.

Exemplary User Interface for Meeting Recording and Playback

Figure 5:
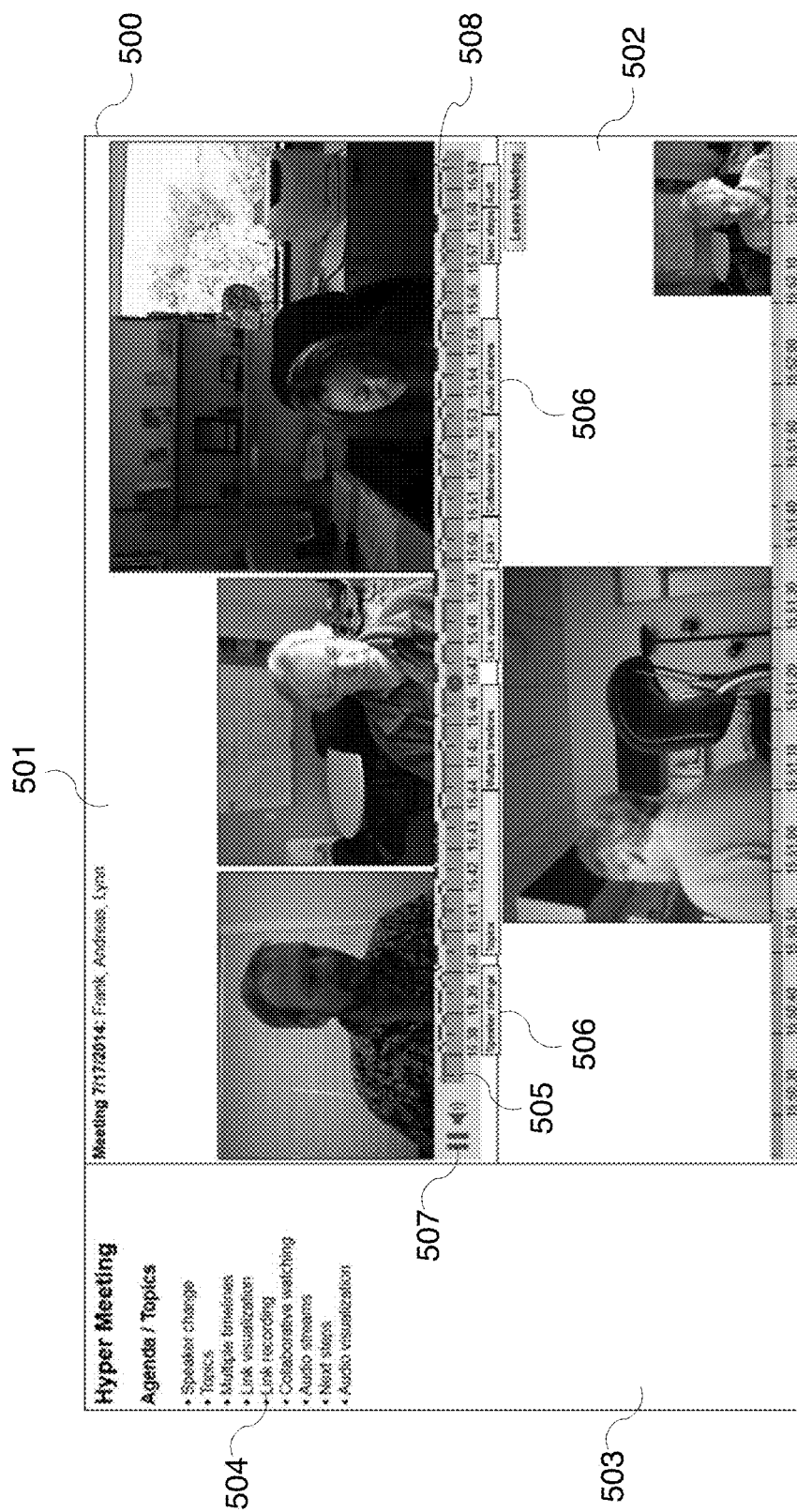
FIG. 5 illustrates an exemplary embodiment of a graphical user interface of the described system for automatic playback of hypervideo.

FIG. 5 illustrates an exemplary embodiment of a graphical user interface 500 of the described system for automatic playback of hypervideo. Specifically, the graphical user interface 500 shown in FIG. 5 is the main meeting capture and review interface. The top right portion 501 of the interface 500 enables the users to watch and navigate within the video streams associated with the playback of a recorded meeting, which took place sometime in the past. The video streams of the current meeting are displayed in the bottom right portion 502, below those of the recorded past meetings. Video playback of the past meeting(s) is a collaborative activity such that any meeting participant can pause or skip the recorded video streams for all participants. The left portion 503 of the graphical user interface 500 displays the list of topics 504 associated with the captured meeting.

In one or more embodiments, the timeline 505 shows the speaker transitions, for example, by means of color-coding 508. In one ore more embodiments, topic tags 506 may be presented below the timeline 505. In one or more embodiments, alternative visualizations in the timeline 505 are used, including, for example, color coding 508 for topics and image indicators for speaker transitions. User can control playback of the meeting streams using playback control 507.

In one or more embodiments, topics are assigned during the initial recording by meeting participants. In the same or different embodiments, the topics may be also assigned by those watching the videos at a later time. Additionally or alternatively, the topics may be assigned through automated mechanisms that match the elements of predefined agendas based on content processing. Initially, a meeting series may have an extensible set of topics, wherein the graphical user interface provides easy access to those recently defined and used. In addition, meeting participants are enabled by the graphical user interface to add to the initial set of topics, which are stored in data structure(s) associated with the corresponding meeting, such as the topic table 221 shown in FIG. 2(*b*).

One exemplary setting illustrating an embodiment of the described techniques, involves a later meeting part, with different participants at a different time, watching the previously recorded meeting part. As the participants watch the prior meeting, they pause the prior meeting video stream and begin discussing the same and related topics. In one or more embodiments, upon receipt of the aforesaid pause command, an embodiment of the system automatically generates one or more links between the paused video and the new discussion that is being recorded. In one or more embodiments, the aforesaid generated link is shown as a start in the timeline.

Figure 6:
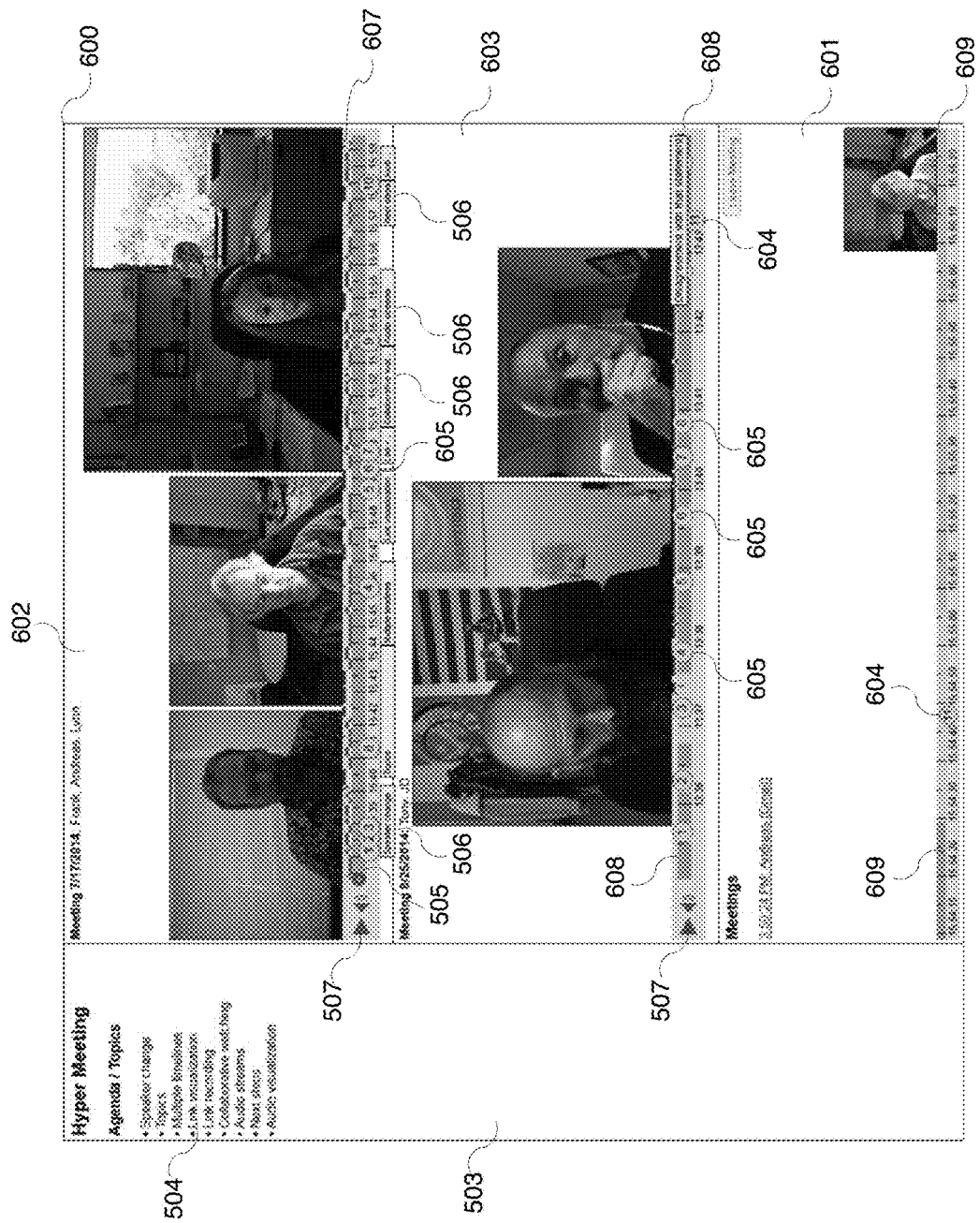
FIG. 6 illustrates an embodiment of a graphical user interface for recording and playback of a meeting in an exemplary situation involving three subsequent meeting parts.

FIG. 6 illustrates an embodiment of a graphical user interface 600 for recording and playback of a meeting in an exemplary situation involving three subsequent meeting parts. The latest meeting part shown in the bottom portion 601 of the user interface 600 represents a sole participant reviewing previous two meeting parts shown in the upper and middle portions 602 and 603, respectively. In the shown embodiment, the link 11 (element 604 in FIG. 6) was recently generated in the third part 601 of a meeting. The older links numbered 1 through 10 (elements 605) point from the first to the second part of the meeting. In one or more embodiments, the system also enables the user to create links for older parts of the meeting to the current part. The vertical position of the circle representing a link (see elements 604 and 605 in FIG. 6) indicates whether it points down to a more recent meeting part or up to an older part. For example, as shown in FIG. 6, links 1-10 on the timeline 505 as well as link 11 on the timeline 608 point down to a more recent meeting part, while links 1-10 on the timeline 608 as well as link 11 on the timeline 609 point up to an older meeting part.

Exemplary Link Following within Meeting

In various embodiments, the aforesaid links can be followed in both directions by clicking on the numbered circle identifying a link (for example, elements 604 and 605 in FIG. 6). When following a link, first the link anchor in the older meeting is played to provide context and then the link anchor in the newer meeting is played. For example, in FIG. 8, after clicking the "1" (element 701), first the source link anchor 800 around the circle 701 would be played, followed by the destination link anchor 804 around the "1" (802), as indicated by the solid line 803. The playback would stop at the end of the destination link anchor 804. Clicking on the "1" 802 would cause the same playback sequence starting at the source link anchor 800. A second click on a link circle advances the playback to the destination link anchor.

Automatic Link Following

Viewing a hypermeeting can be a purely manual interaction where the user selects which hyperlinks should be followed and which parts of the video should be skipped. However, it is advantageous to automate this navigation through video based on the systems knowledge of the viewing users' participation and interests.

In addition to user-initiated link traversal, links may also be automatically traversed as they are encountered. Continuous playback of the multipart meeting can move back and forth between the original and additional video content as links are encountered. For example, as links to newer meetings are encountered, the playback automatically follows that link and returns to the original position after playing the destination link anchor.

Figure 8:
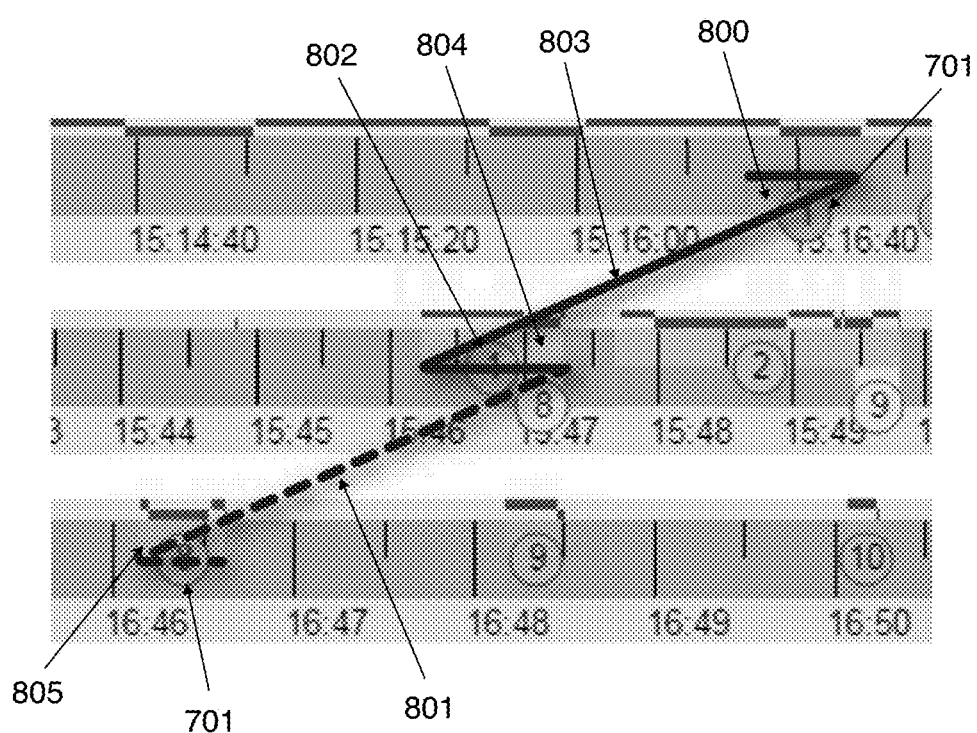
FIG. 8 shows exemplary playback plans for playing both halves of a link, and then stopping, as would happen if a user clicked on the link without automatic link-following enabled, or automatically following a second link.

If the linked video contains a link to a more recent meeting, that link is followed in the same fashion. The dashed line 801 in FIG. 8 provides an example of this behavior. While the user played the content of link "1", link "8" was encountered and automatically followed. Because the ends of the link anchors of links "1" and "8" line up, playback would stop at the end of the segment 805 surrounding "8".

Exemplary Timelines Showing Topics, Participants, Links, and Link Labels

In one or more embodiments, the timeline 505 is designed to provide a variety of visualizations to the participants based on the topic and speaker as well as navigational links between or within recordings that have been authored or automatically generated are shown as icons (for example, numbered circles 605 in FIG. 6). For example, discussed topics 606 may be shown below the timeline 505, in the manner illustrated in FIG. 6. In addition, the speakers may be indicated using color-coding 607 over the timeline 505, see FIG. 6.

Finally, links are indicated by numbered circles 605 on the timeline 505. The numbers provide users with information about the destination of the links. As shown in FIG. 6, links shown with numbered circles 605 in the timeline 505 correspond to similarly numbered links in the timeline 608. In one or more embodiments, additional information regarding the links may appear when the mouse cursor lingers over the corresponding icon.

Hypervideo Playback Plans

In one or more embodiments, depending on the information need of the user, there are many different ways links could be followed automatically. In accordance with one embodiment, there is provided the abstraction of playback plans to describe such automatic behavior. The result of a specific playback plan applied to a specific hypermeeting is similar to an edit decision list for video editing. It consists of a sequence of video segments from multiple videos that are played in order. Unlike edit decision lists, playback plans are computed automatically based on available links, filter conditions, and previous behavior of the user. In one or more embodiments, the playback plans themselves encode logic for deciding when to follow links and when to not.

Some exemplary playback plans are a generalization of hypervideo link behaviors—that is they determine what happens when the beginning or ending of a source or destination link anchor is encountered during playback. Alternative playback plans may represent filters that skip over undesired portions of a video such as silence. More complex plans can be combinations of such behaviors. Playback plans may also alter the playback speed.

Figure 7:
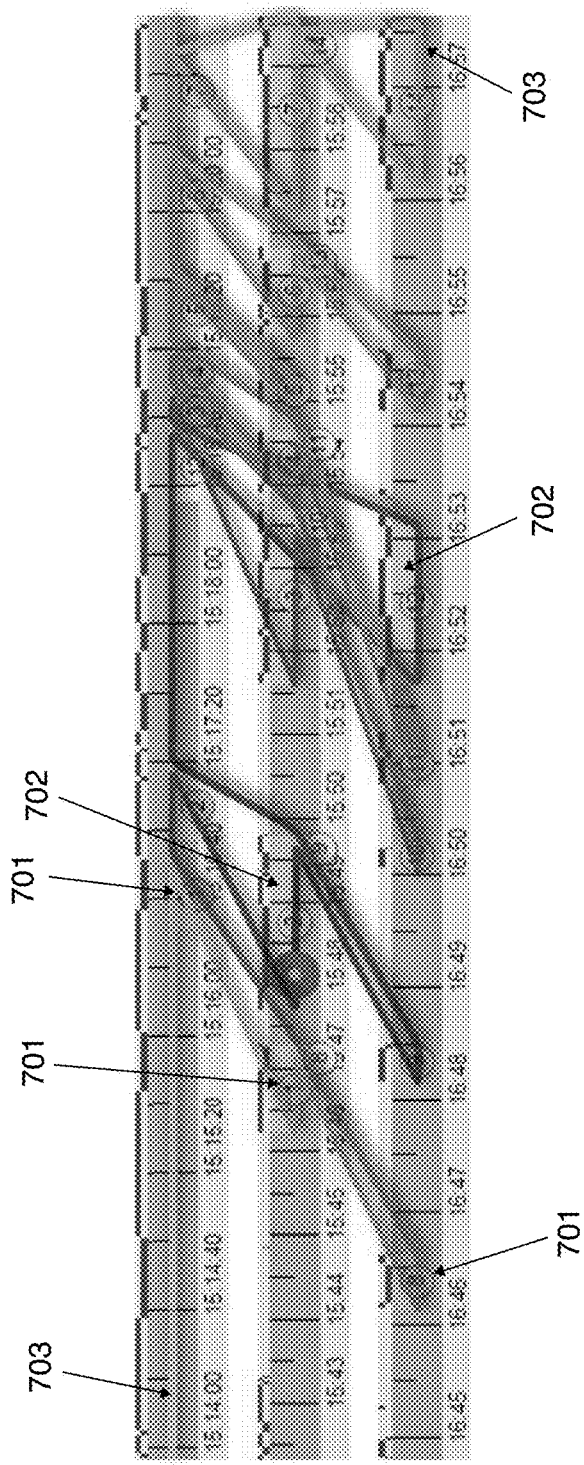
FIG. 7 illustrates an exemplary embodiment of timelines for a chain of three meetings.

FIG. 7 illustrates an exemplary embodiment of timelines for a chain of three meetings. The circles 701 indicate hyperlinks with the numbers matching the two halves of a link. The colored areas 702 surrounding the circles are the link anchors. Superimposed as a gradient line 703 to indicate playback progress is a plan for playing the oldest meeting in the chain while automatically following all links to newer meetings. Note that link "12" to the newest meeting at 16:52 causes out-of-order playback. After returning from link "9", link "12" is followed next, then links "3", "10", "4", and "11".

FIG. 8 shows an exemplary playback plan for playing both halves of link "1", see element 701 in FIG. 7, and then stopping, as would happen if a user clicked on the link without automatic link-following enabled. If automatic link-following were enabled, link "8" would be played, too, as indicated by the dashed line 801.

In one or more embodiments, all playback plans may include filter criteria. One exemplary filter may be configured to skip silence in the video. Such a filter is useful in situations where meeting attendees are listening to an older meeting without speaking at the same time. Attendees of a future meeting would want to skip that period of silence. Other exemplary filters could focus on particular topics or speakers.

In one or more embodiments, plans may also be personalized based on who is speaking in each segment. Thus, an exemplary plan could play any responses to segments in which the current user was a speaker, first playing the original segment followed by the responses. Similarly, exemplary topic-oriented plans may play through segments tagged with particular topics and any content attached to those segments.

Navigation within Playback Plans

In one or more embodiments, manual navigation within a playback plan, i.e., skipping to a part of the video that is covered by the plan, just continues the plan from that position in the video. Other user interaction could include clicking on a link label while playing the source of that link. Such an interaction skips the playback to the destination of that link and continues the plan from there. Navigation to a part of the video not covered by the current playback plan leads to the computation of a new playback plan including that part of the video, by default a plan that plays the video of the current meeting and follow links to all later meetings.

Types of Playback Plans

In one or more embodiments, playback plans are computed when a user clicks on a link, navigates to a different meeting in the chain, or navigates outside the current plan. In one or more embodiments, playback plans can be used to filter recorded content and are interactive (i.e., users can navigate within a playback plan). We identified playback plans that are appropriate to particular use scenarios.

TABLE 1

| Context of Use | Likely Viewing Behavior | Plan Behavior |
| --- | --- | --- |
| Reviewing a meeting that one participated in | Look for specific segments based on topic | Play segments on a topic |
| Reviewing multiple meetings that one participated in or has viewed | Look for related segments across meetings based on topic | Play segments on a topic with embedded links to additional related discussions |

TABLE 1-continued

| Context of Use | Likely Viewing Behavior | Plan Behavior |
|---|---|---|
| Viewing a meeting where one was absent | View the whole meeting | Play the meeting |
| Viewing a meeting where one was absent but at prior meetings | View the whole meeting in the context of prior meetings | Play the meeting with contextual segments from prior meetings |
| Viewing multiple related meetings where one was absent | View all the meetings with an understanding of relations between meetings | Play the oldest meeting in its entirety along with links to related content in newer meetings, then play additional content in newer meetings |
| Viewing multiple related meetings where one was absent but at some prior meeting | View all the unseen meetings with an understanding of relations between these meetings and their relations to prior meetings | Play the absent meeting in its entirety along with links to related content in newer meetings, then play additional content in newer meetings together with contextual segments from prior meetings |

Table 1 details six exemplary contexts of use for playback plans, the information goals of the user in these contexts, and the playback plan behavior. It should be noted that the exemplary contexts shown in Table 1 are exemplary only and should not be considered in the limiting sense. In one embodiment, the described system implements playback plans for the more common scenarios that include automatically following links to newer meetings, either for a whole meeting or a single link, in combination with a filter for silence.

In one or more embodiments, selecting a playback plan can take into account characteristics of users, such as their participation in meetings. In the case of a user who has not participated in the meeting chain, it would make sense to play the video of the meeting that started the chain and to automatically follow all links to subsequent meetings such that those comments can be viewed in context. Such a traversal through the hypervideo would skip the parts of the subsequent meetings that are not linked, presumably because the content in these portions is not related to the older meetings. This is the behavior illustrated in FIG. 7.

Another exemplary default plan would be for a person who participated in a series of meetings and wished to review comments linked to meeting he attended. In this case the source anchors in the meeting he attended would be played before playing the linked comment, but any links to previous meetings encountered while playing the source anchors would be ignored.

Visualization of Playback Plans Via Timeline

Figure 9:
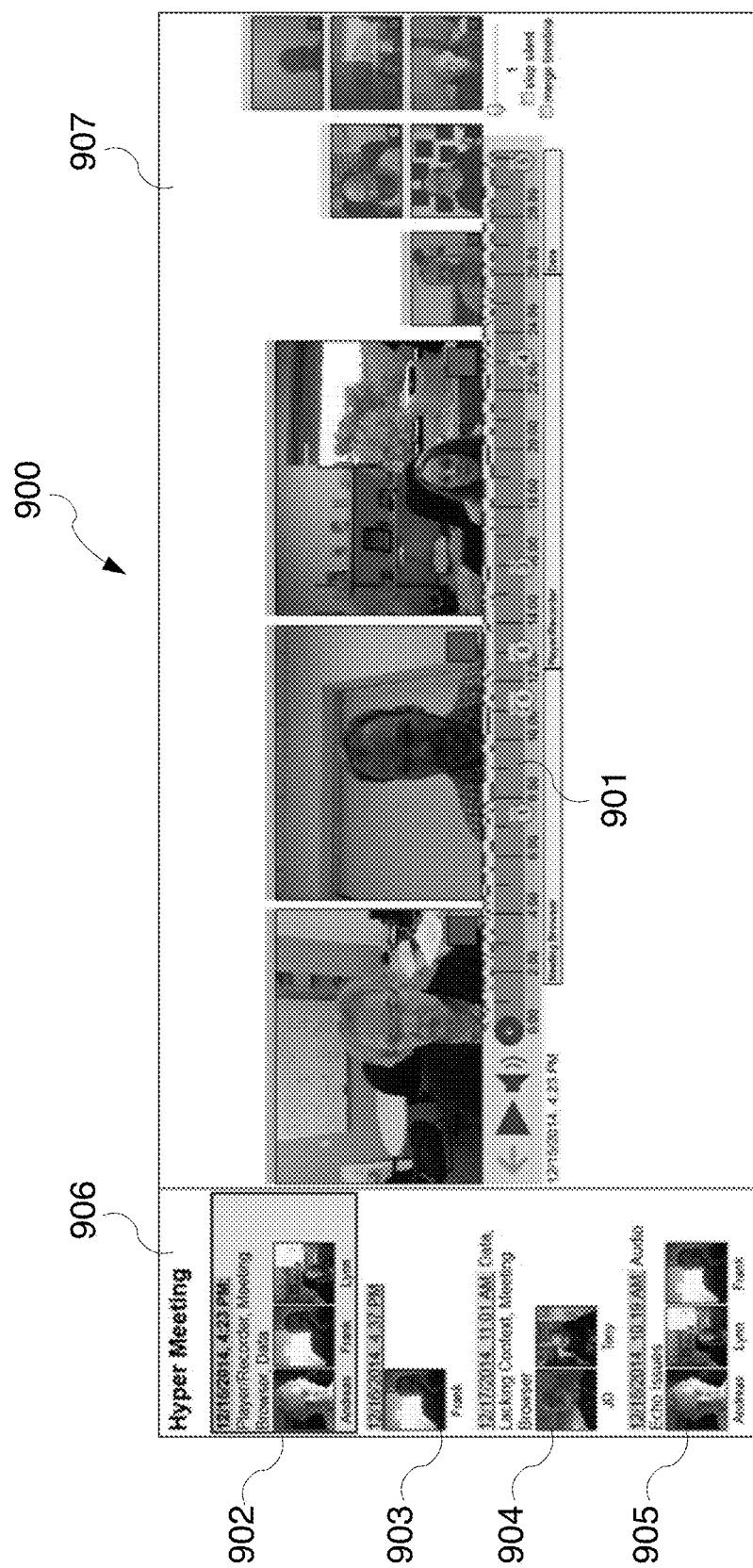
FIG. 9 illustrates an exemplary embodiment of a user interface implementing a playback plan visualization technique.

Turning now to the visualization of hypervideo playback plans, three alternative exemplary embodiments of methods for visualization of playback plans via timelines will be discussed in detail below. The first such exemplary visualization method involves the creation of a user interface showing the standard view of the video timeline, see FIG. 9. Specifically, FIG. 9 illustrates an exemplary embodiment of a user interface 900 implementing such visualization method. In the shown view, the hypervideo structure, which is comprised of a set of recorded synchronous meetings and a set of links between segments of these recordings, is presented to the user with one recorded meeting being visualized at a time. In this view, the whole middle part of the timeline 901 is colored (for example dark gray) indicating that whole meeting is included in the playback plan. After navigating to another meeting, the timeline for only that meeting is shown. For example, when playback switches to the green meeting, the timeline would look like the timeline 1102 shown in FIG. 11 (with dark gray areas indicating the playback plan), with the exception that it would use the whole width of the timeline. In the aforesaid FIG. 9, the timeline 901 for only the oldest meeting 902 is shown. The meetings 902, 903, 904 and 905, which form the hypermeeting are shown in the left part 906 of the user interface 900 and selectable by the user. Upon the user selection of the specific meeting, the timeline for the corresponding meeting (902, 903, 904 or 905) is displayed in the right part 907 of the user interface 900.

Figure 10:
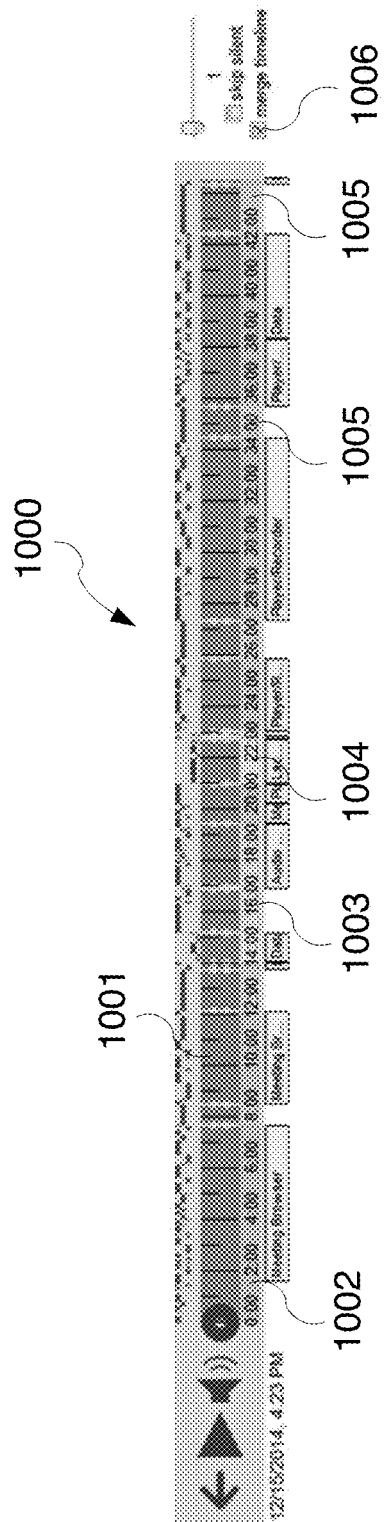
FIG. 10 illustrates an exemplary embodiment of a user interface implementing a playback plan visualization technique using merged timeline.

However, the study of the user experience in connection with the use of the first visualization technique illustrated in FIG. 9 demonstrated that using this type of visualization, users do not develop an accurate mental model of the video segment payback sequence. Therefore, to improve user's expectations of what they are about to see during the playback of the hypervideo, a method for visualizing a playback plan using a merged timeline is provided. In one or more embodiments, the merged timeline concatenates the portions of the recorded meetings that will be shown to the user in accordance with the current playback plan. An exemplary embodiment of a portion of a user interface 1000 employing such a merged timeline 1001 is illustrated in FIG. 10. The merged timeline 1001 covers the oldest meeting and all meetings linked from it using the hypervideo links described in detail above. In one or more embodiments, bottom portions 1002, 1003, 1004 and 1005 of the merged timeline 1001 corresponding to specific meetings may be color-coded based on the color code of the respective meetings.

In the graphical user interface embodiment 1000 shown in FIG. 10, the links between video segments in the hypervideo are not themselves visualized because the automatic link traversal is implied pursuant to the playback plan and the links are represented in the timeline by color changes between the colored portions 1002, 1003, 1004 and 1005 at the bottom of the timeline 1001. In one or more embodiments, links outside the playback plan cannot be selected in this view. In this visualization shown in FIG. 10, colors of the bottom portions 1002, 1003, 1004 and 1005 of the merged timeline 1001 are used to indicate which meeting will be shown at which specific time. Additionally, in one or more embodiments, this view merges and standardizes the colors assigned to the meeting participants so the same person has the same color across meetings in order to present speaker segmentation information along with the merged timeline.

Figure 11:
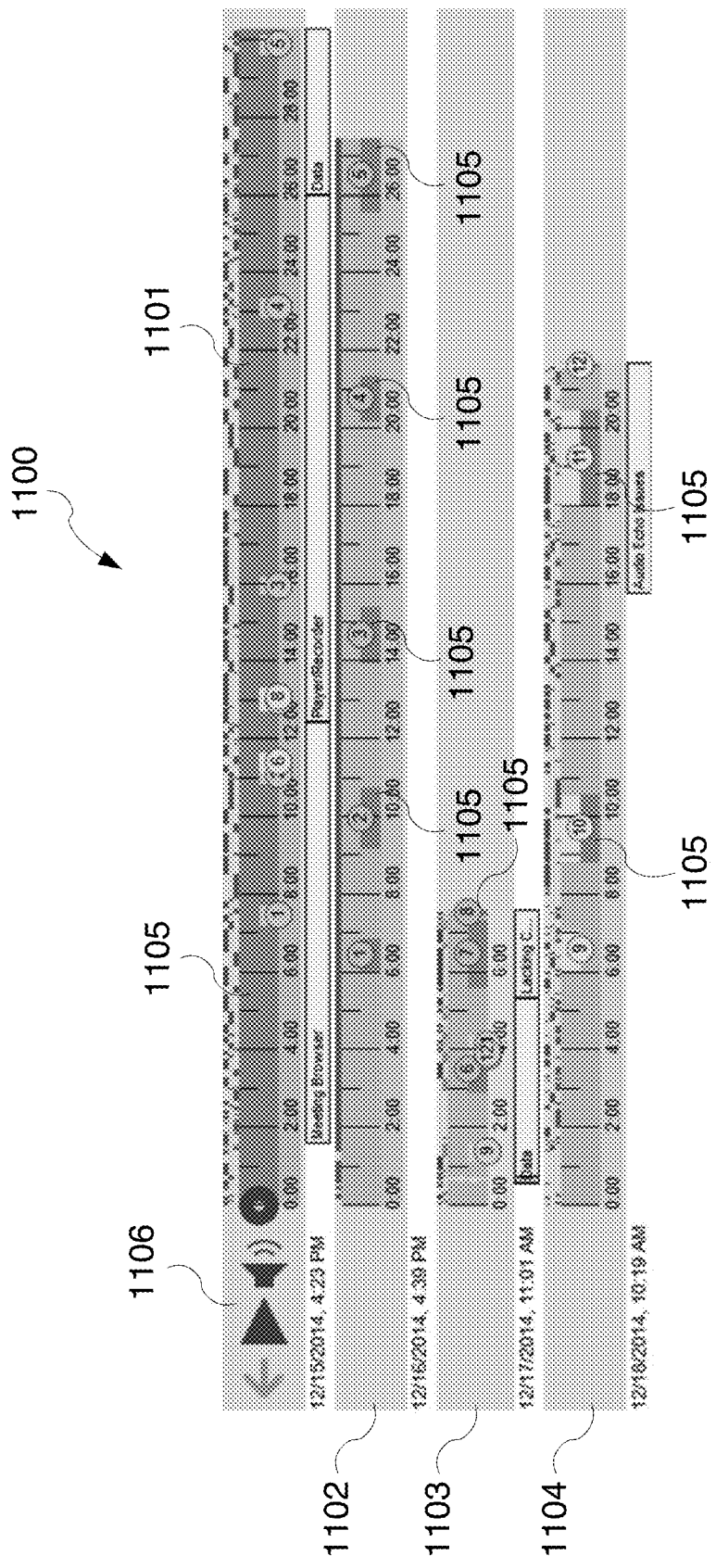
FIG. 11 illustrates an exemplary embodiment of a user interface implementing a playback plan visualization technique involving displaying timelines for all meetings.

As would be appreciated by persons of ordinary skill in the art, a possible weakness of the merged timeline 1001 shown in FIG. 10 is that it does not provide information about the material not included in the current playback plan so users do not know how much content they are going to see relative to the amount available and the relative positions of the segments in the meetings. Therefore, a third exemplary embodiment of a playback plan visualization shown in FIG. 11 has been designed that includes this omitted from the playback plan content but at the cost of providing multiple timelines simultaneously rather than users having a single timeline as in the above visualizations. FIG. 11 illustrates an exemplary embodiment of a user interface 1100, which includes timelines 1101, 1102, 1103 and 1104 of all meetings of a hypermeeting. The vertically middle portions of the timelines 1101, 1102, 1103 and 1104 actually included in the current playback plan are coded with a different color or shade, such as dark gray.

As can be seen from FIG. 11, the stack of timelines 1101, 1102, 1103 and 1104 show the hypervideo structure (as in the first visualization) but also show the segments of all meetings 1105 (color-coded with different color or shade) that are part of the current playback plan, as in the second visualization shown in FIG. 10. The coverage of the current playback plan is indicated by a darker shade in the middle of the timeline bar, see the timeline portions 1105.

Figure 12:
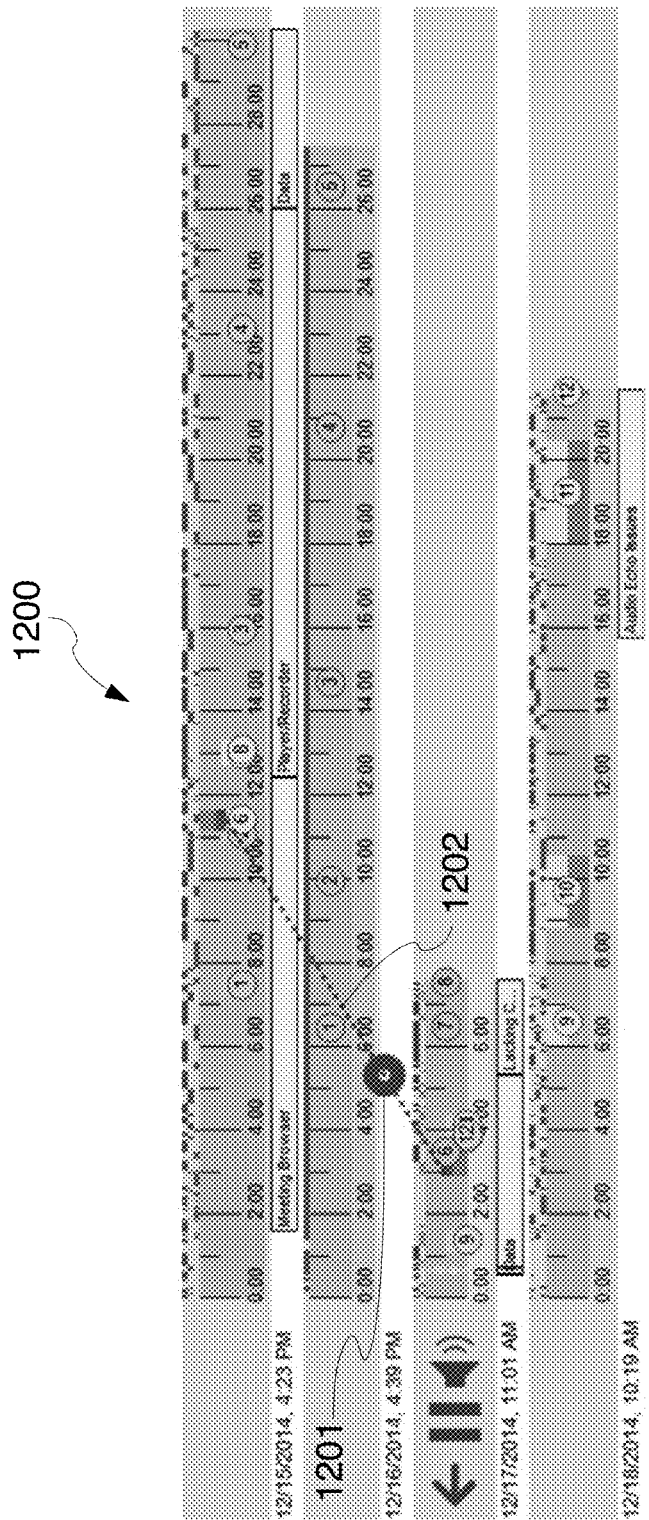
FIG. 12 illustrates an exemplary embodiment of a user interface implementing a playback plan visualization technique involving displaying timelines for all meetings and animation of playback indicator.

In one or more embodiments, in the stack of timelines 1101, 1102, 1103 and 1104 shown in FIG. 11, the playback control 1106 moves to the timeline of the meeting currently being played. In the embodiment shown in FIG. 12, while following a link, the playback indicator 1201 is animated in its path from one meeting to the other. Specifically, in the shown embodiment, the playback indicator 1201 moves along a dashed line 1202 during link traversal to provide the user with the visual cue of the link following pursuant to the playback plan.

Transition Between Views of Playback Plans

As would be appreciated by persons of ordinary skill in the art, no single visualization is likely to be best in all use contexts. Thus, there a need for user selectable and automatic ways of transitioning between the views of the playback plan. Therefore, in one or more embodiments, the graphical user interface for visualizing a playback plan may include a toggle or other graphical user interface widget for users to switch between different playback plan views. An exemplary embodiment of such a widget is a checkbox "merge timeline" 1006 at the right of FIG. 10. Activation of this widget by the user causes the user interface to merge the hypermeeting timelines and generate the merged timeline 1001 illustrated in FIG. 10. Furthermore, in one or more embodiments, double-clicking on the hypermeeting timeline toggles between a merged and non-merged timeline from the other two views.

Figure 13:
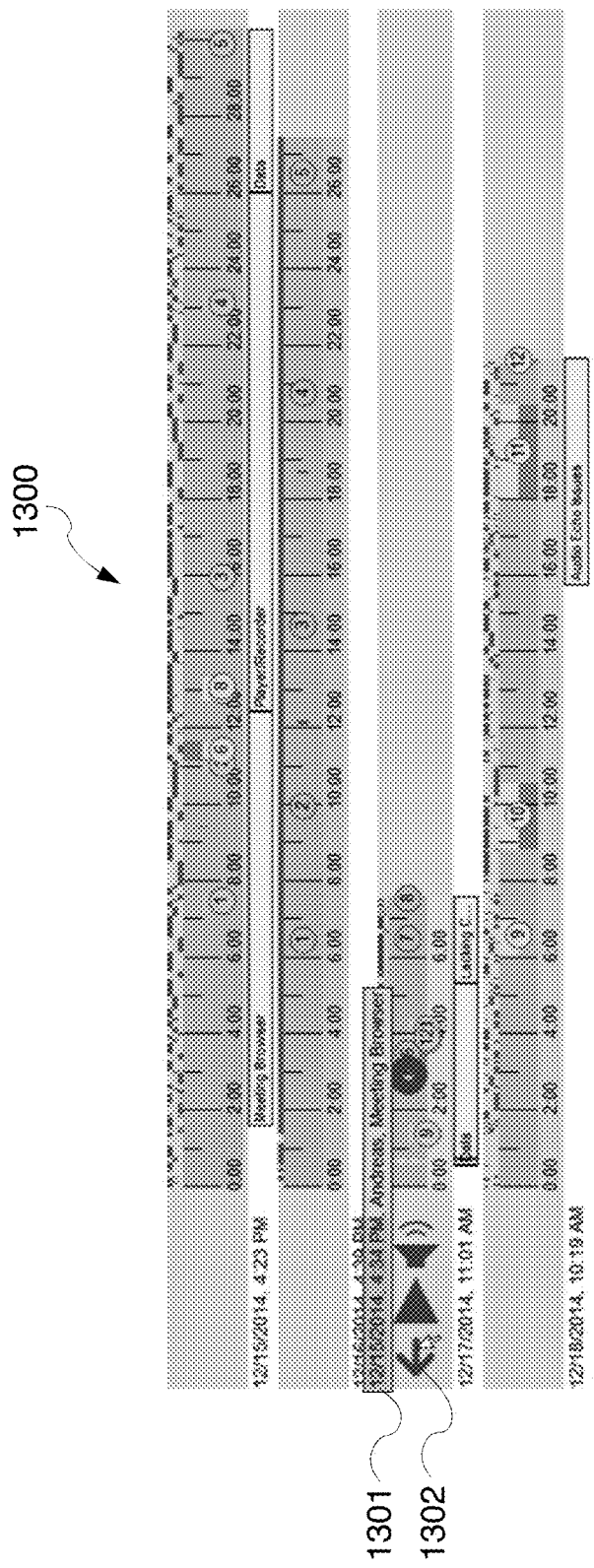
FIG. 13 illustrates an exemplary embodiment of a user interface implementing a playback plan visualization technique involving displaying timelines for all meetings and back button showing time, speaker, and topic.

Recording History of Transitions Between Playback Plans and Navigation within History Because of the difficulty in distinguishing content within meetings, wherein the video consists of talking heads and the topics are often coarsely defined, it would be desirable for the users to navigate within the hypervideo in an exploratory way, creating new playback plans and then backing out of that navigation. To support this behavior, one embodiment of the graphical user interface for hypermeeting playback records a history of these user navigations and incorporates a "back" button as is found in most hypertext browsers. FIG. 13 illustrates an exemplary embodiment 1300 of such graphical user interface incorporating a tooltip (popup) 1301 for back button 1302 showing time, speaker, and topic. Using the exemplary embodiment 1300 of the graphical user interface shown in FIG. 13, users simply press the back button 1302 to undo their most recent navigational action. To undo their prior navigation they press the back button 1302 again. In other words, the back button 1302 may be pressed several times to reach the appropriate place in the user's hypermeeting navigational history.

In one or more embodiments, to provide the user with information about where the user will return to when pressing the back button 1302, a tooltip visualizes the state of the hypermeeting playback at that point. In various embodiments, there can be several classes of visualizations. The first exemplary class of visualizations uses metadata and presents textual information potentially including the date of the meeting, the time offset into the meeting, and the topic and who was speaking at that time, see popup 1301 in FIG. 13. In FIG. 13, the tooltip 1301 shows the position in the meeting before the animated link traversal 1201 depicted in FIG. 12. A second exemplary visualization involves creating a thumbnail of the timeline (or merged timeline) at that point and includes an indicator of the position in that timeline that the user will return to. A third exemplary visualization combines the above metadata-based and graphics based views.

Figure 14:
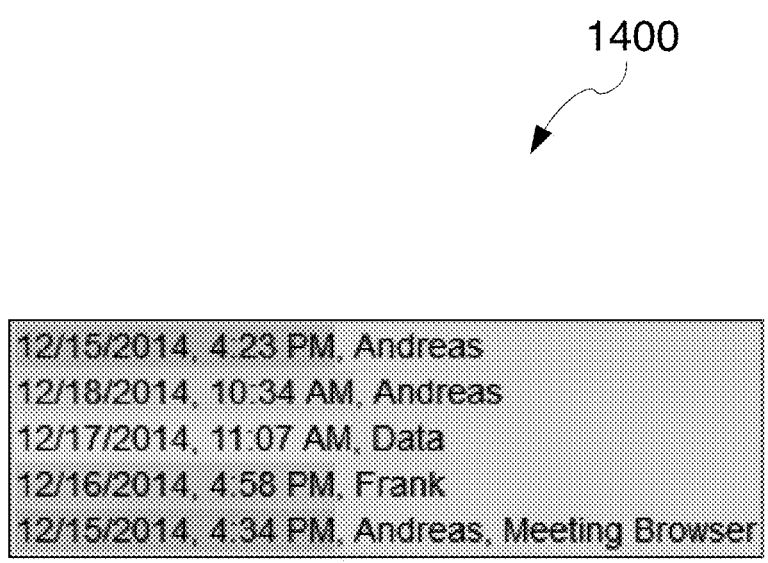
FIG. 14 illustrates an exemplary embodiment of a navigation history stack.

In one or more embodiments, as with web browsers, users can directly return back to positions more than one navigational action prior through a visualization of the navigation stack. In one embodiment, this visualization is composed of a list 1400 of the above visualizations that the user can select among, see FIG. 14, wherein each item on the list is color-coded with a color corresponding to the color of the respective timeline segment. To make use of users' experience with Web browsers, this visualization can be accessed either by going to a history view or by right clicking on the back button 1302.

Exemplary Computer Platform

Figure 15:
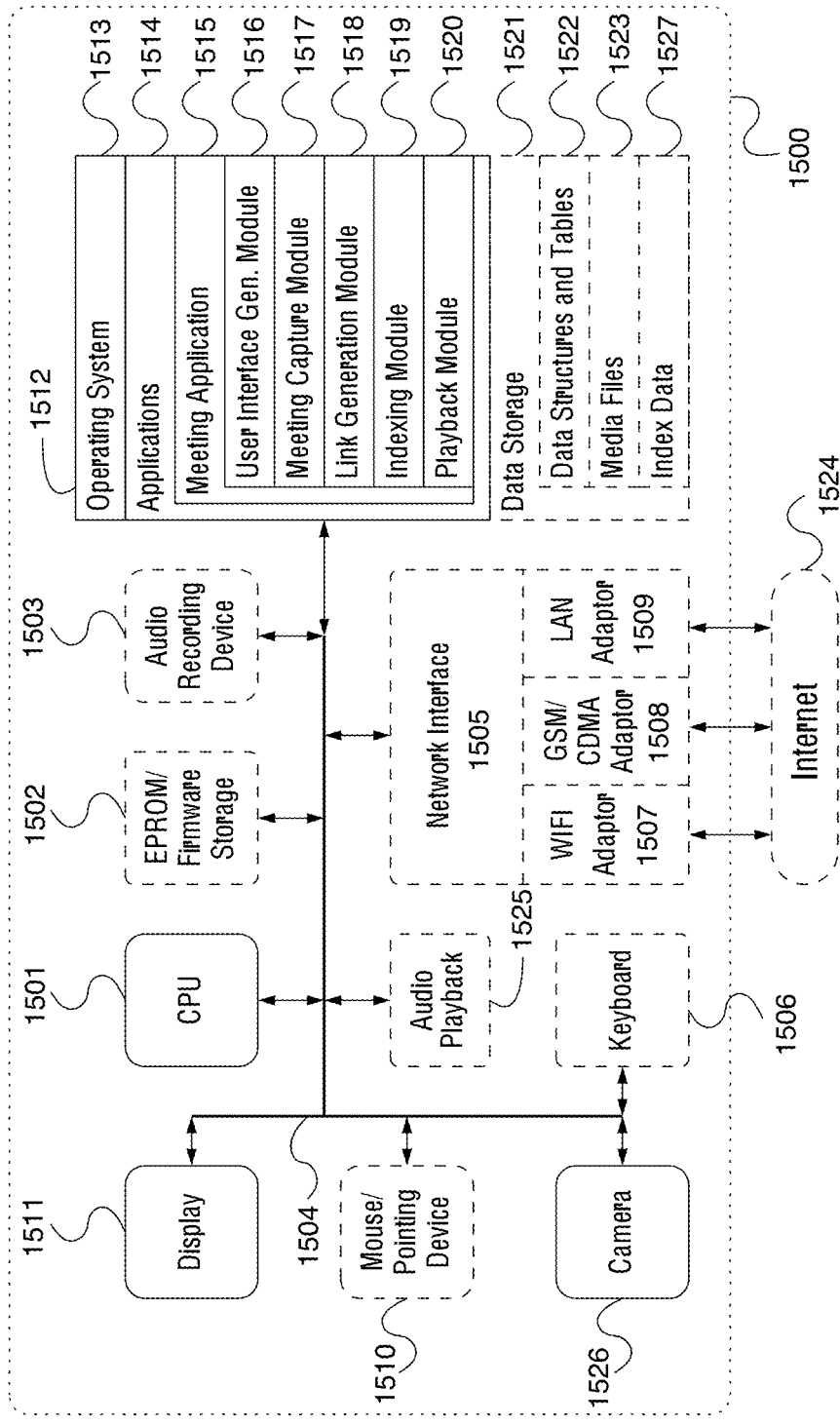
FIG. 15 illustrates an exemplary embodiment of a computerized system for automatic playback of hypervideo and visualizing playback plans.

FIG. 15 illustrates an exemplary embodiment of a computerized system 1500 for automatic playback of hypervideo, such as hypervideo associated with a series of asynchronous meetings, as well as visualizing hypervideo playback plans. In one or more embodiments, the computerized system 1500 may be implemented within the form factor of a desktop computer well known to persons of skill in the art. In an alternative embodiment, the computerized system 1500 may be implemented based on a laptop or a notebook computer or any other mobile computing device, such as a smartphone or a tablet computer.

The computerized system 1500 may include a data bus 1504 or other interconnect or communication mechanism for communicating information across and among various hardware components of the computerized system 1500, and a central processing unit (CPU or simply processor) 1501 electrically coupled with the data bus 1504 for processing information and performing other computational and control tasks. Computerized system 1500 also includes a memory 1512, such as a random access memory (RAM) or other dynamic storage device, coupled to the data bus 1504 for storing various information as well as instructions to be executed by the processor 1501. The memory 1512 may also include persistent storage devices, such as a magnetic disk, optical disk, solid-state flash memory device or other non-volatile solid-state storage devices.

In one or more embodiments, the memory 1512 may also be used for storing temporary variables or other intermediate information during execution of instructions by the processor 1501. Optionally, computerized system 1500 may further include a read only memory (ROM or EPROM) 1502 or other static storage device coupled to the data bus 1504 for storing static information and instructions for the processor 1501, such as firmware necessary for the operation of the computerized system 1500, basic input-output system (BIOS), as well as various configuration parameters of the computerized system 1500.

In one or more embodiments, the computerized system 1500 may incorporate a display device 1511, which may be also electrically coupled to the data bus 1504, for displaying various information to a user of the computerized system 1500, such as the user interfaces showing hypermeeting parts and playing the hypervideo as described herein. In an alternative embodiment, the display device 1511 may be associated with a graphics controller and/or graphics processor (not shown). The display device 1511 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 1511 may be incorporated into the same general enclosure with the remaining components of the computerized system 1500. In an alternative embodiment, the display device 1511 may be positioned outside of such enclosure, such as on the surface of a table or a desk. In one or more embodiments, the computerized system 1500 may further incorporate an audio capture device 1503, such as a microphone, configured to capture the audio component(s) of a meeting and store the recorded audio information in the memory 1512.

In one or more embodiments, the computerized system 1500 may further incorporate an audio playback device 1525 electrically connected to the data bus 1504 and configured to play various audio files, such as MPEG-3 files, or audio tracks of various video files, such as MPEG-4 files, which may be the audio components of the recorded meetings, as it is well known to persons of ordinary skill in the art. To this end, the computerized system 1500 may also incorporate waive or sound processor or a similar device (not shown).

In one or more embodiments, the computerized system 1500 may incorporate one or more input devices, such as a mouse/pointing device 1510, such as a mouse, a trackball, a touchpad, or cursor direction keys for communicating direction information and command selections to the processor 1501 and for controlling cursor movement on the display 1511. This input device typically has two degrees of freedom in two axes, a first axis (e.g., x) and a second axis (e.g., y), that allows the device to specify positions in a plane.

The computerized system 1500 may further incorporate a camera 1526 for acquiring still images and video of various objects, including the video of the meetings described herein, as well as a keyboard 1506, which all may be coupled to the data bus 1504 for communicating information, including, without limitation, images and video, as well as user commands (including gestures) to the processor 1501.

In one or more embodiments, the computerized system 1500 may additionally include a communication interface, such as a network interface 1505 coupled to the data bus 1504. The network interface 1505 may be configured to establish a connection between the computerized system 1500 and the Internet 1524 using at least one of a WIFI interface 1507, a cellular network (GSM or CDMA) adaptor 1508 and/or local area network (LAN) adaptor 1509. The network interface 1505 may be configured to enable a two-way data communication between the computerized system 1500 and the Internet 1524. The WIFI adaptor 1507 may operate in compliance with 802.11a, 802.11b, 802.11g and/or 802.11n protocols as well as Bluetooth protocol well known to persons of ordinary skill in the art. The LAN adaptor 1509 of the computerized system 1500 may be implemented, for example, using an integrated services digital network (ISDN) card or a modem to provide a data communication connection to a corresponding type of telephone line, which is interfaced with the Internet 1524 using Internet service provider's hardware (not shown). As another example, the LAN adaptor 1509 may be a local area network interface card (LAN NIC) to provide a data communication connection to a compatible LAN and the Internet 1524. In an exemplary implementation, the WIFI adaptor 1507, the cellular network (GSM or CDMA) adaptor 1508 and/or the LAN adaptor 1509 send and receive electrical or electromagnetic signals that carry digital data streams representing various types of information.

In one or more embodiments, the Internet 1524 typically provides data communication through one or more subnetworks to other network resources. Thus, the computerized system 1500 is capable of accessing a variety of network resources located anywhere on the Internet 1524, such as remote media servers, web servers, other content servers as well as other network data storage resources. In one or more embodiments, the computerized system 1500 is configured to send and receive messages, media and other data, including application program code, through a variety of network(s) including the Internet 1524 by means of the network interface 1505. In the Internet example, when the computerized system 1500 acts as a network client, it may request code or data for an application program executing on the computerized system 1500. Similarly, it may send various data or computer code to other network resources.

In one or more embodiments, the functionality described herein is implemented by computerized system 1500 in response to processor 1501 executing one or more sequences of one or more instructions contained in the memory 1512. Such instructions may be read into the memory 1512 from another computer-readable medium. Execution of the sequences of instructions contained in the memory 1512 causes the processor 1501 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 1501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 1501 for execution. For example, the instructions may initially be carried on a magnetic disk from a remote computer. Alternatively, a remote computer can load the instructions into its dynamic memory and send the instructions over the Internet 1524. Specifically, the computer instructions may be downloaded into the memory 1512 of the computerized system 1500 from the foresaid remote computer via the Internet 1524 using a variety of network data communication protocols well known in the art.

In one or more embodiments, the memory 1512 of the computerized system 1500 may store any of the following software programs, applications or modules:

1. Operating system (OS) 1513 for implementing basic system services and managing various hardware components of the computerized system 1500. Exemplary embodiments of the operating system 1513 are well known to persons of skill in the art, and may include any now known or later developed mobile operating systems.

2. Applications 1514 may include, for example, a set of software applications executed by the processor 1501 of the computerized system 1500, which cause the computerized system 1500 to perform certain predetermined functions, such as display the graphical user interface(s) on the display device 1511 or record video of a meeting using the camera 1526. In one or more embodiments, the applications 1514 may include an inventive application 1515 for automatic generation and playback of hypervideo, described in detail below.

3. Data storage 1521 may store, for example, the data structures and tables 1522 for storing various information associated with hypermeetings, as illustrated, for example, in FIGS. 2(a) and 2(b). In addition, the data storage 1521 may include media files 1523 of the actual recorded media streams corresponding to the meetings as described herein as well as index data 1527.

In one or more embodiments, the inventive meeting application 1515 for automatic generation and playback hypervideo incorporates a user interface generation module 1516 configured to generate one or more user interfaces illustrated, for example, in FIGS. 5 and 6. In addition, there may be provided a video capture module 1517 for capturing video and audio stream(s) using the audio capture device 1503 and the camera 1526. Yet additionally, there may be provided a link generation module 1518 for automatically generating links between video segments parts as described above and storing the generated links in the data storage portion 1522. Additionally provided may be an indexing module 1519 for indexing speaker and topic information, see steps 303 and 305 in FIG. 3. Finally, playback module 1520 may be provided to facilitate the automatic playback of the generated hypervideo, for example in accordance with one of the playback plans shown in Table 1.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for automatic playback of hypervideo by means of a playback plan and for visualizing the aforesaid playback plans. It is intended that the specification and examples be considered as exemplary only, with a true scope and spirit of the invention being indicated by the following claims.

What is claimed is:

1. A computer-implemented method for visualizing an instruction for an automated playback of a hypervideo, the hypervideo comprising a first plurality of video segments from a first video of a first meeting and a second plurality of video segments from a second video of a second meeting, the first meeting being prior to the second meeting, the method being performed in connection with a computerized system comprising a central processing unit, a display device and a memory, the computer-implemented method comprising:
   a. generating the instruction for automatically following a plurality of links linking the at least some of the first plurality of video segments of the first video of the first meeting with the at least some of the second plurality of video segments of the second video of the second meeting such that at least some of the plurality of video segments are automatically played in a predetermined non-sequential order by automatically following the plurality of links linking the first plurality of video segments and the second plurality of video segments; and
   b. generating a graphical user interface portion on the display device for visualizing the instruction.

2. The computer-implemented method of claim 1, wherein the graphical user interface portion comprises a timeline for one of the plurality of videos.

3. The computer-implemented method of claim 1, wherein the graphical user interface portion comprises a video selection portion for selecting one of the plurality of videos.

4. The computer-implemented method of claim 3, wherein upon selection of the one of the plurality of videos, the graphical user interface portion displays a timeline for the selected one of the plurality of videos.

5. The computer-implemented method of claim 3, wherein each of the plurality of videos in the video selection portion is color-coded.

6. The computer-implemented method of claim 1, wherein the graphical user interface portion comprises a merged timeline for at least two of the plurality of videos.

7. The computer-implemented method of claim 6, wherein the merged timeline comprises a plurality of color-coded timeline portions corresponding to each of the least two of the plurality of videos.

8. The computer-implemented method of claim 6, wherein the graphical user interface portion comprises a merge timeline widget and wherein upon activation of the merge timeline widget by a user, the graphical user interface portion displays the merged timeline for at least two of the plurality of videos.

9. The computer-implemented method of claim 1, wherein the graphical user interface portion comprises a playback control portion comprising a play button.

10. The computer-implemented method of claim 1, wherein the graphical user interface portion comprises timelines for each of the plurality of videos.

11. The computer-implemented method of claim 10, wherein each of the timelines is color-coded.

12. The computer-implemented method of claim 10, wherein each of the plurality of video segments included in the instruction is marked on the timeline for the corresponding one of the plurality of videos.

13. The computer-implemented method of claim 12, wherein each of the plurality of video segments included in the instruction is marked on the timeline for the corresponding one of the plurality of videos with a different color or a different shade.

14. The computer-implemented method of claim 10, wherein the graphical user interface portion comprises a playback control portion and wherein the playback control portion indicates an active timeline corresponding to a video from the plurality of videos being currently played.

15. The computer-implemented method of claim 10, wherein the graphical user interface portion comprises a playback indicator for visualizing a traversal of one of the plurality of links included in the instruction.

16. The computer-implemented method of claim 15, wherein the playback indicator is animated and moves between two timelines corresponding to the videos linked by the one of the plurality of links.

17. The computer-implemented method of claim 1, wherein the graphical user interface portion comprises a back widget and wherein upon activation of the back widget by a user, the graphical user interface portion reverts to a previous playback state.

18. The computer-implemented method of claim 17, wherein the graphical user interface portion comprises a tooltip portion comprising information on the previous playback state.

19. The computer-implemented method of claim 18, wherein the information on the previous playback state comprises date, time and topic of a corresponding meeting.

20. The computer-implemented method of claim 1, further comprising maintaining a history of hypervideo navigation states.

21. The computer-implemented method of claim 1, wherein the graphical user interface portion comprises a timeline and wherein each of the plurality of video segments included in the instruction is marked on the timeline.

22. A computerized system for visualizing a playback plan of a hypervideo, the hypervideo comprising a first plurality of video segments from a first video of a first meeting and a second plurality of video segments from a second video of a second meeting, the first meeting being prior to the second meeting, wherein at least some of the first plurality of video segments of the first video are linked with at least some of the second plurality of video segments of the second video using a plurality of links, the computerized system comprising a central processing unit, a display device and a memory storing a set of computer-executable instructions for:

a. generating the playback plan for an automated playback of the hypervideo, the playback plan comprising instructions for automatically following the plurality of links linking the at least some of the first plurality of video segments of the first video of the first meeting with the at least some of the second plurality of video segments of the second video of the second meeting such that at least some of the plurality of video segments are automatically played in a predetermined non-sequential order by automatically following the plurality of links linking the first plurality of video segments and the second plurality of video segments, wherein the plurality of links are followed based on the playback plan; and b. generating a graphical user interface portion on the display device for visualizing the playback plan.

23. A non-transitory computer-readable medium embodying a set of computer-executable instructions, which, when executed in a computerized system comprising a central processing unit, a display device and a memory, cause the computerized system to perform a method for visualizing a playback plan of a hypervideo, the hypervideo comprising a first plurality of video segments from a first video of a first meeting and a second plurality of video segments from a second video of a second meeting, the first meeting being prior to the second meeting, wherein at least some of the first plurality of video segments of the first video are linked with at least some of the second plurality of video segments of the second video using a plurality of links, the method comprising:

a. generating the playback plan for an automated playback of the hypervideo, the playback plan comprising instructions for automatically following the plurality of links linking the at least some of the first plurality of video segments of the first video of the first meeting with the at least some of the second plurality of video segments of the second video of the second meeting that at least some of the plurality of video segments are automatically played in a predetermined non-sequential order by automatically following the plurality of links linking the first plurality of video segments and the second plurality of video segments, wherein the plurality of links are followed based on the playback plan and wherein the at least some of the first plurality of video segments of the first video are linked with the at least some of the second plurality of video segments of the second video using the plurality of links based on content of the respective video segments; and b. generating a graphical user interface portion on the display device for visualizing the playback plan.

* * * * *